Nov. 25, 1930.  H. WILEY  1,782,642
INTERNAL COMBUSTION ENGINE
Filed March 13, 1928   2 Sheets-Sheet 2

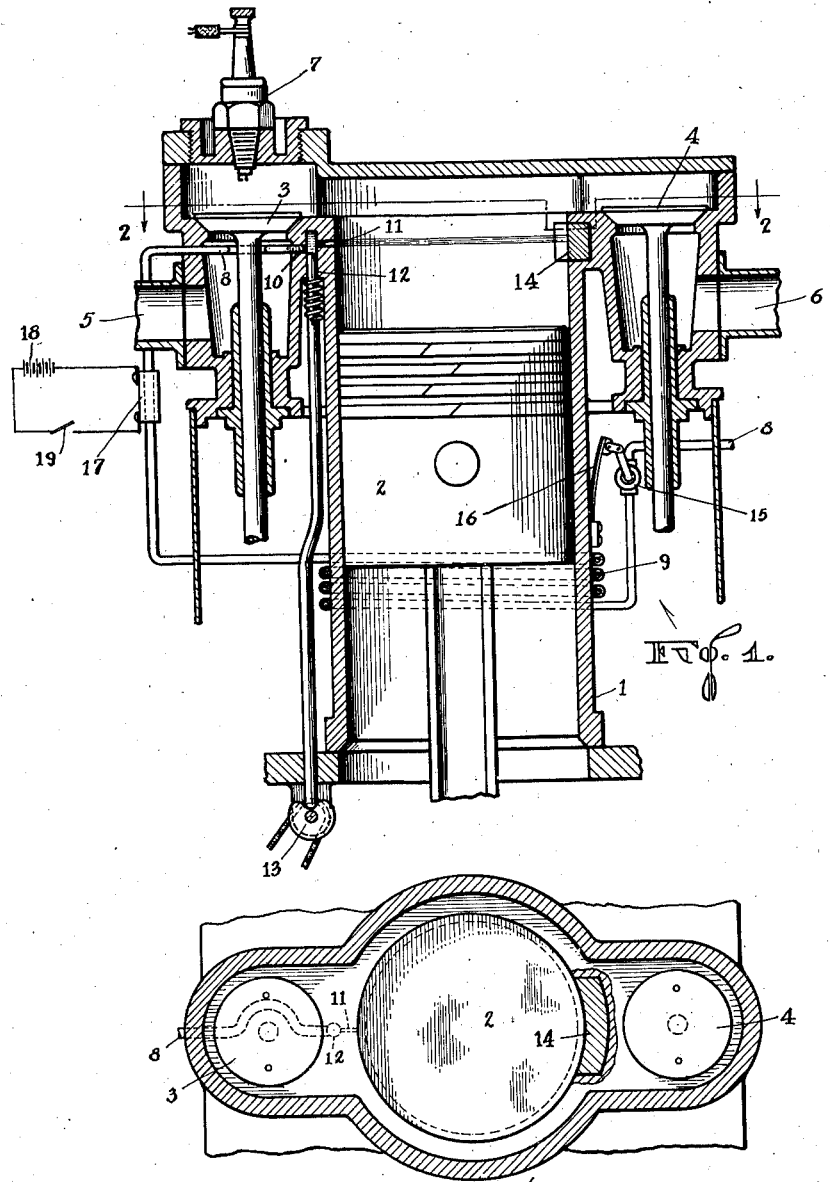

INVENTOR.
HUGH WILEY.
BY
Munn & Co.
ATTORNEYS.

Patented Nov. 25, 1930

1,782,642

UNITED STATES PATENT OFFICE

HUGH WILEY, OF LOS ALTOS, CALIFORNIA

INTERNAL-COMBUSTION ENGINE

Application filed March 13, 1928. Serial No. 261,308.

My invention relates to improvements in internal combustion engines, and it consists in the combinations, constructions, and arrangements hereinafter described and claimed.

A great amount of gasoline is consumed in internal combustion engines in heating the water that is used to keep the engine cool. The purpose of the present invention is to utilize the heat given off by the cylinders, and transform this into additional power for actuating the engine.

The means for doing this consists of heating water by the heat given off from the cylinders, and changing this water into steam, and then utilizing this steam for propelling the engine. In the present drawings I have shown steam being employed in the same cylinder in which the explosion takes place, and as a modified form I have shown separate steam cylinders in which pistons are mounted, these pistons being connected to the crank shaft of the engine.

Other objects and advantages will appear in the following specification, and the novel features of my invention will be particularly pointed out in what I hereinafter claim.

My invention is illustrated in the accompanying drawing forming a part of this application, in which:

Figure 1 is a vertical section through an internal combustion engine, showing my device operatively applied thereto;

Figure 2 is a section along the line 2—2 of Figure 1;

Figure 3:
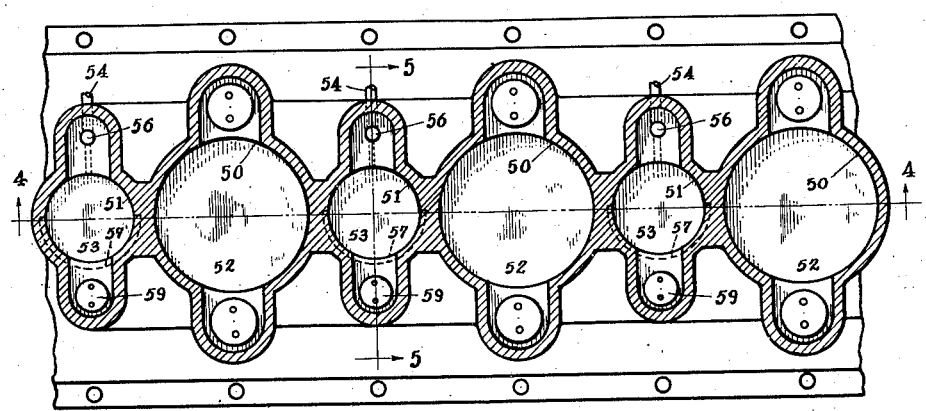
Figure 3 is a section along the line 3—3 of Figure 4.

In carrying out my invention I make use of a cylinder 1 in which a piston 2 is mounted. As many cylinders as desired may be used, but since one will be identical to another, I will only illustrate and describe one. The cylinder has an intake valve 3, and an exhaust valve 4, placing it in communication with an intake pipe 5, and an exhaust pipe 6. A spark plug 7 is used and is timed in the usual manner for exploding the compressed gas within the cylinder.

The explosions occurring in the cylinder create an enormous amount of heat and the usual method of carrying away this heat has been by jacketing the cylinders in water. I utilize this heat in obtaining more power, while at the same time keeping the temperature of the cylinder walls at a low enough point to allow the engine to operate efficiently.

Figure 1 shows a water pipe 8 leading from any source, not shown. This pipe is wrapped around the cylinder in a coil 9, and then passes through the cylinder wall and terminates at the point 10. A bore 11 places the pipe 8 in communication with the interior of the cylinder, and this bore is opened and closed by means of a valve 12, operated from a cam 13.

The theory involved is this: after the temperature of the cylinder wall exceeds a predetermined point, water or water vapor is injected into the cylinder, just after the gas has been exploded and before the piston has reached its lowermost position. This water impinges against a hot plate 14, and is instantly changed into steam. This steam expands in the usual manner and aids in forcing the piston 2 downwardly. The heat consumed in changing the water into steam is sufficient to keep the cylinder wall at the proper temperature.

It is known that the exploding gases expend themselves during the first quarter or half of the explosion stroke. The momentum of the piston carries it through the remainder of the stroke. It is the purpose of the present invention to inject the water vapor at the proper instant to form steam which will expand and work upon the piston just after the termination of the explosion, i. e., when the exploding gases have expended all their energy. The valve 12 is timed to accomplish this.

I have shown a thermostatically controlled valve 15 for the water pipe 8, and the thermostat 16 connected to this valve is designed to function when the temperature of the cylinder wall reaches a predetermined point. In this way water will not be injected into the cylinder when the motor is cold.

If it is desired to use water at the starting of the engine, a heating coil 17 may be connected with a source of current 18 by a switch 19. This coil will pre-heat the water, and will permit the water injecting device to be used at the time the engine is started. The thermostat 16 and valve 15 are not used when the coil 17 is used. A pump, not shown, of course will be provided for forcing the water through the pipe 8.

I have shown the hot-plate 14 as being mounted in the cylinder wall, but this plate could be disposed at the top of the cylinder head, instead, if so desired. The position and the shape of the hot-plate are immaterial.

Figure 4:
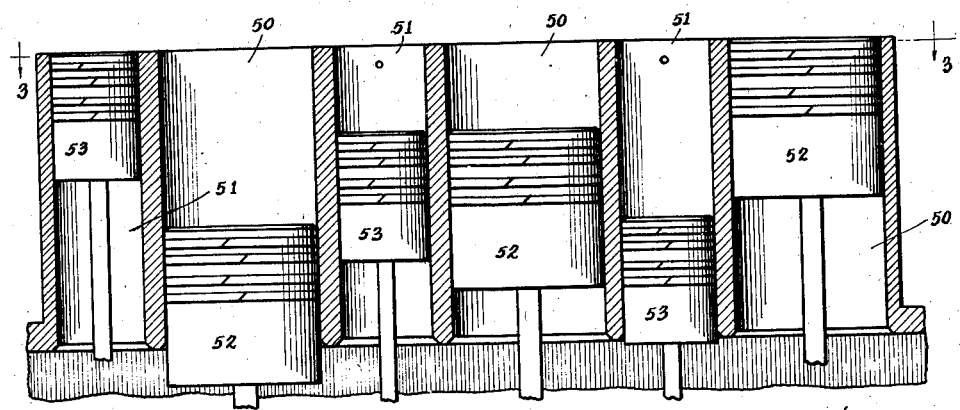
Figure 4 is a section along the line 4—4 of Figure 3.
Figure 5:
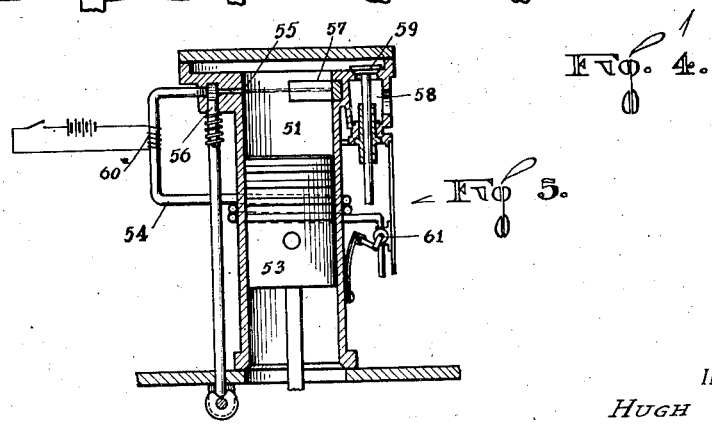
Figure 5 is a vertical section taken along the line 5—5 of Figure 3.

In Figures 3, 4, and 5 I have shown a modified form of the device. In this form the engine block is divided into a plurality of cylinders 50 and auxiliary cylinders 51. Pistons 52 and 53 are mounted in the cylinders 50 and 51, respectively. The cylinders 50 and pistons 52 correspond with the usual internal combustion engine cylinders. I have not thought it necessary to show the valves, nor the spark plugs for these cylinders, inasmuch as I have shown a similar arrangement in Figure 1. In place of the water jacket, I dispose the auxiliary cylinders 51 between the main cylinders, and the walls of these cylinders are heated by the walls of the main cylinders. If water or water vapor is led against these heated walls, it will be turned into steam and this steam can be utilized for actuating the pistons 53.

Reference to Figure 5 shows that the water or water vapor is conveyed through a pipe 54. This pipe terminates at a bore 55 and the bore in turn is closed or opened by a valve 56. A hot plate 57 may be mounted in the cylinder wall or the wall of the cylinder itself may be hot enough to change the water vapor into steam. This steam acts upon the piston 53, then is exhausted through the exhaust port 58. An exhaust valve 59 is provided for this purpose. The pistons 52 and 53 are connected to a common crank shaft (not shown in the drawings) and it will therefore be seen that the heat given off by the cylinder walls 50 will be changed into power and aid in the rotation of the crank shaft. Figure 5 also shows a heating coil 60 and a thermostatically controlled valve 61, these parts being similar to the valve 15 and heating coil 17.

When the engine is started the water in the pipe 54 may be pre-heated by means of the coil 60 or the pistons 53 may be allowed to idle until the cylinder walls 50 have generated sufficient heat to pre-heat the water 54, whereupon the cylinders 51 will function as steam cylinders.

Although I have shown and described various embodiments of my invention, it is to be understood that the same is susceptible of various changes and I reserve the right to employ such changes as may come within the scope of the invention as claimed.

I claim:

1. An internal combustion engine comprising a cylinder, a piston mounted therein, means for directing water into said cylinder just after the explosion takes place, and prior to the completion of the exploded stroke, and a hot plate disposed in said cylinder for changing the water into steam.

2. In an internal combustion engine, a cylinder, a water pipe communicating therewith, a portion of said pipe being wrapped around said cylinder, and a thermostatically controlled valve for said pipe being actuated by the heat given off by the cylinder.

3. In an internal combustion engine, a cylinder, a piston movable therein, a water pipe connected with said cylinder, a coil disposed around said pipe for preheating the water before it enters the cylinder, and a hot plate disposed in the cylinder adapted to change the heated water into steam.

4. An internal combustion engine comprising a cylinder having an aperture therein, a piston mounted in said cylinder, a hot plate disposed in said cylinder diametrically opposite the aperture, and means for directing water through said aperture and against said hot plate prior to the completion of the power stroke.

HUGH WILEY.